United States Patent
Zevenbergen (10) Patent No.: US 9,878,587 B1
(45) Date of Patent: Jan. 30, 2018

(54) MOVABLE BASE FOR A ROBOTIC SYSTEM

(71) Applicant: X Development LLC, Mountain View, CA (US)

(72) Inventor: John Zevenbergen, Saratoga, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 15/338,834

(22) Filed: Oct. 31, 2016

(51) Int. Cl.
| | |
|---|---|
| B60D 1/00 | (2006.01) |
| B60D 99/00 | (2009.01) |
| B25J 5/00 | (2006.01) |
| B62D 53/02 | (2006.01) |
| F16C 19/36 | (2006.01) |

(52) U.S. Cl.
CPC ............... B60D 7/00 (2013.01); B25J 5/007 (2013.01); B62D 53/02 (2013.01); F16C 19/364 (2013.01)

(58) Field of Classification Search
CPC ...... B62D 12/00; B62D 23/00; B62D 33/077; B60D 7/00
USPC .......................................... 280/400; 180/235
See application file for complete search history.

(56) References Cited

U.S. PATENT DOCUMENTS

| | | | | | |
|---|---|---|---|---|---|
| 2,342,407 | A * | 2/1944 | Le Tourneau | ....... | B62D 53/021 280/492 |
| 3,773,129 | A * | 11/1973 | Anderson | ............. | E02F 9/0841 180/14.4 |
| 3,828,578 | A * | 8/1974 | Herscovici | ................ | F16D 3/41 184/105.1 |
| 7,784,570 | B2 * | 8/2010 | Couture | .................... | B25J 5/005 180/65.8 |
| 8,646,567 | B2 * | 2/2014 | Werner | ................ | B62D 53/025 180/235 |
| 8,696,010 | B2 * | 4/2014 | Toebes | ................... | B65G 13/00 280/400 |
| 8,863,882 | B2 * | 10/2014 | Landoll | .................... | B62D 5/14 180/235 |
| 2011/0018230 | A1 * | 1/2011 | Roose | .................... | B62D 12/00 280/400 |
| 2013/0313806 | A1 * | 11/2013 | Hansen | ................ | F16C 33/7886 280/515 |
| 2014/0151137 | A1 * | 6/2014 | Giles-Brown | .......... | F16B 21/00 180/14.4 |

* cited by examiner

Primary Examiner — Tony Winner
(74) Attorney, Agent, or Firm — McDonnell Boehnen Hulbert & Berghoff LLP (57) ABSTRACT

A robotic body includes a first section and a second section. The first section includes a first wheel, and the second section includes a second wheel. A coupling assembly couples the first section and the second section. The coupled first section and second section are movable together via operation of the wheels. The coupling assembly includes a housing defining an interior chamber, a spindle disposed in the interior chamber of the housing, and a bearing device disposed in the interior chamber and between the housing and the spindle. The bearing device allows the spindle to rotate inside the interior chamber and relative to the housing. The first section is coupled to the housing and the second section is coupled to the spindle. The first section rotates relative to the second section according to a rotation between the spindle and the housing.

20 Claims, 5 Drawing Sheets

MOVABLE BASE FOR A ROBOTIC SYSTEM

BACKGROUND

A robot may include one or more end-effectors that allow the robot to act on objects. In some cases, an end-effector may be coupled to an arm of a robot. The robot can operate the arm to extend and position the end-effector to act on an object. The robot must typically provide a stable base to counter any forces that robot may experience when operating the arm and/or end-effector.

SUMMARY

A robotic system may include a lower body that supports and moves the robotic system along a surface. The lower body includes a front section and a rear section that are joined together via a coupling assembly. The front section includes one pair of wheels, and the rear section includes another pair of wheels. Advantageously, the coupling assembly allows the lower body to respond more effectively to changes in the forces and moments it experiences. In particular, the front section and the rear section are able to rotate relative to each other about an axis so that the position of the wheels can change to help maintain contact with the surface to provide better balance for the lower body.

According to aspects of the present disclosure, a robotic system includes a robotic body including a first section and a second section. The first section includes a first wheel, and the second section includes a second wheel. The robotic system includes a coupling assembly coupling the first section and the second section. The first section and the second section are movable together along at least one axis via operation of the first wheel and the second wheel. The coupling assembly includes a housing defining an interior chamber, a spindle disposed in the interior chamber of the housing, and a bearing device disposed in the interior chamber of the housing and between the housing and the spindle. The bearing device allows the spindle to rotate inside the interior chamber and relative to the housing. The first section is coupled to the housing of the coupling assembly and the second section is coupled to the spindle of the coupling assembly. The coupling assembly allows the first section to rotate relative to the second section according to a rotation between the spindle and the housing.

According to aspects of the present disclosure, a coupling assembly for a robotic system includes a housing defining an interior chamber. The housing includes a first interface configured to engage a first section of a robotic body. The system includes a spindle disposed in the interior chamber of the housing. The spindle includes a second interface configured to engage a second section of a robotic body. The system includes two tapered roller bearings disposed in the interior chamber of the housing and between the housing and the spindle. The two tapered roller bearings are arranged in opposing orientations to handle axial forces in opposing directions. The two tapered roller bearings allow the housing and the spindle to rotate relative to each other. The two tapered roller bearings including an inner ring, an outer ring, and a bearing assembly disposed between the inner ring and the outer ring and allowing the outer ring to rotate around the inner ring. The housing engages the outer ring and the spindle passes through and engages the inner ring. The first interface and the second interface allows a relative rotation between the first section coupled to the first interface and the second section coupled to the second interface according to the relative rotation between the housing and the spindle.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

The following detailed description describes various features and functions of the disclosed systems and methods with reference to the accompanying figures. The illustrative system and method embodiments described herein are not meant to be limiting. It will be readily understood that certain aspects of the disclosed systems and methods can be arranged and combined in a wide variety of different configurations, all of which are contemplated herein.

I. Overview

A robot may include one or more end-effectors that allow the robot to act on objects. In some cases, an end-effector may be coupled to an arm of a robot. The robot can operate the arm to extend and position the end-effector to act on an object. The robot must typically provide a stable base to counter any forces that robot may experience when operating the arm and/or end-effector.

An example robotic system includes an upper body with an arm and an end-effector disposed on the arm. With the arm, the robotic system can position the end-effector within a three-dimensional space. The robotic system also includes a lower body with two pairs of wheels. The upper body is coupled to the lower body. The wheels can thus be operated to move the upper body along the surface. In particular, the upper body may be moved to position the end-effector at one or more locations where it can perform one or more tasks.

The lower body may experience different forces and moments while supporting the upper body along the surface. For instance, the weight of the upper body acts on lower body and the effect of this weight may change when the arm is moved to different positions and the center of mass of the upper body changes. In addition, the lower body may experience the effect of external loads applied to the end-effector. Furthermore, the lower body may experience reaction forces and moments from a surface (e.g., ground surface) below. The different forces and moments may affect the balance of the lower body on the surface. Furthermore, different surfaces, e.g., uneven surfaces, may affect the balance of the lower body.

In example embodiments, the lower body includes a front section and a rear section that are joined together via a coupling assembly. The front section includes one pair of the wheels, and the rear section includes the other pair of wheels. Advantageously, the coupling assembly allows the lower body to respond more effectively to changes in the forces and moments it experiences. In particular, the front section and the rear section are able to rotate relative to each other about an axis so that the position of the wheels can change to help maintain contact with the surface to provide better balance for the lower body.

In contrast to other coupling devices that may be employed to allow relative rotation between the front section and the rear section, the coupling assembly in the example embodiments provides greater stability and rigidity for the operation of the lower body. In particular, the coupling assembly can more effectively restrict rotation about the other axes. In other words, if the coupling assembly allows the front section to rotate relative to the rear section about the x-axis, the coupling assembly provides greater resistance to bending moments and/or torsion about the y- and z-axes.

Although the example robotic system above includes an upper body with an arm and an end-effector disposed on the arm, aspects of the lower body can provide a base for other robotic system configurations. For instance, in some configurations, the lower body above can support an upper body that experiences loads via structures other than an arm and/or an end-effector. In other configurations, the lower body can support a lifting mechanism similar to a pallet jack or a fork lift. In yet other configurations, the lower body can support a cargo container or receptacle. In further configurations, the lower body can support a conveyor belt that unloads or loads objects from or to a truck container or pallet. In general, the robotic system aspects of the lower body can provide a base for various robotic system configurations that experience loads.

II. Example Robotic System

Figure 1:
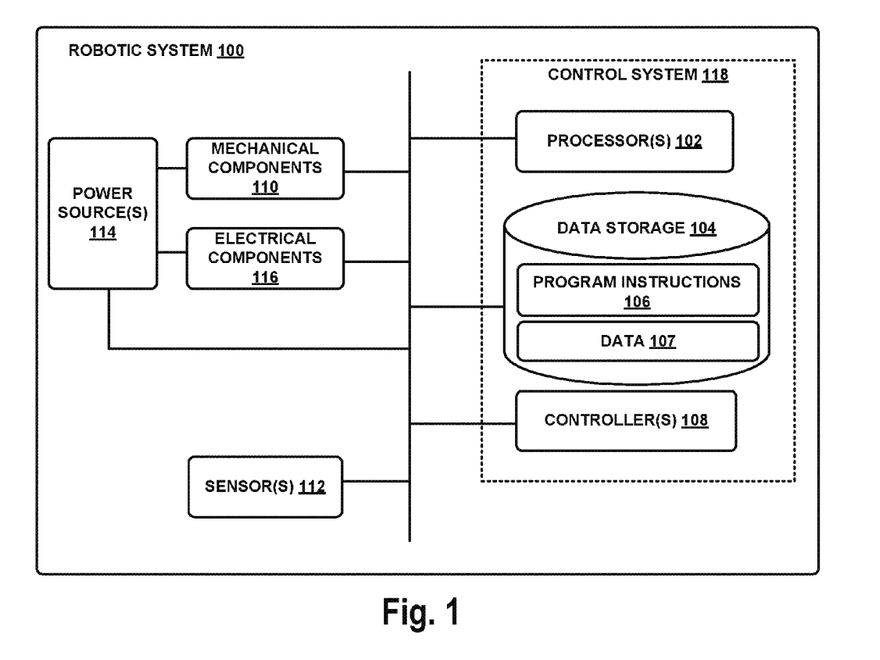
FIG. 1 illustrates an example configuration of a robotic system according to aspects of the present disclosure.

FIG. 1 illustrates an example configuration of a robotic system 100 that may be used in connection with the embodiments described herein. The robotic system 100 may be configured to operate autonomously, semi-autonomously, and/or using directions provided by user(s). The robotic system 100 may also be referred to as a robot, robotic device, or mobile robot, among other designations. Generally, the robotic system 100 provides a device that has a computing ability and that can interact with its surroundings with an actuation capability and/or with ability to emit/generate physical phenomena such as light and/or sound, among others.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. The robotic system 100 is shown for illustrative purposes, and may include more or fewer components. The various components of the robotic system 100 may be connected in any manner, including wired or wireless connections. Further, in some examples, components of the robotic system 100 may be distributed among multiple physical entities rather than a single physical entity. Other example embodiments of the robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by the processor(s) 102. The one or more computer-readable storage media can include volatile and/or non-volatile storage components, such as optical, magnetic, organic, or another type of memory or storage, which can be integrated in whole or in part with the processor(s) 102. In some embodiments, the data storage 104 can be a single physical device. In other embodiments, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks) interface between any combination of the mechanical components 110, the sensor(s) 112, the power source(s) 114, the electrical components 116, the control system 118, and/or a user of the robotic system 100. In some embodiments, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between the mechanical components 110 and/or the electrical components 116. In some instances, the control system 118 may serve as an interface between the robotic system 100 and another computing device.

During operation, the control system 118 may communicate with other systems of the robotic system 100 via wired or wireless connections, and may further be configured to communicate with one or more users of the robotic system 100. As one possible illustration, the control system 118 may receive an input (e.g., from a user or from another robot) indicating an instruction to perform a particular action.

A wired connection in the robotic system 100 may include, for example, a parallel bus or a serial bus such as a Universal Serial Bus (USB). Meanwhile, a wireless connection in the robotic system 100 may include, for example, Bluetooth, IEEE 802.11 (such as IEEE 802.11-2007, IEEE 802.11n-2009, or any other IEEE 802.11 revision), cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (such as CDMA, GSM, or WiMAX, as well as "WiFi" connectivity using IEEE 802.11).

The robotic system 100 may include access points through which the control system 118 may communicate with a cloud server or other network resource. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

Further, the control system 118 may serve as an interface between the robotic system 100 and a user. For instance, the control system 118 may include various components for communicating with the robotic system 100. The example interfaces and communications may be implemented via a wired or wireless connection, or both.

The control system 118 may include an input/output unit. The input/output unit may output information to a user through a display. The display may take on any form and may be arranged to project images and/or graphics to a user of the control system 118. As such, the display may show a graphical user interface (GUI) that may provide an application through which the user may interact with the systems disclosed herein.

Additionally, the input/output unit may receive user-input (e.g., from the user of the control system 118). In particular, the input/output unit may allow for interaction with the GUI such as for scrolling, providing text, and/or selecting various features of the application, among other possible interactions. The input/output unit may take on various forms. In one example, the input/output unit may include a pointing device such as a computing mouse used for control of the GUI. However, if the input/output unit includes a touch screen display, touch-input can be received (e.g., such as using a finger or a stylus) that allows for control of the GUI. In another example, the input/output unit may include a keyboard that provides for selection of numbers, characters and/or symbols to be displayed via the GUI. For instance, in the arrangement where the input/output unit includes a touch screen display, portions the display may show the keyboard. Thus, touch-input on the portion of the display including the keyboard may result in user-input such as selection of specific numbers, characters, and/or symbols to be shown on the GUI through the display. In yet another example, the input/output unit may include a voice input device that receives audio input, such as from a user through a microphone, that is then interpretable using one of various speech recognition techniques into one or more characters that may be shown through the display. Other examples may also be possible.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that enable the robotic system 100 to perform physical operations. As a few examples, the mechanical components 110 may include physical members such as leg(s), arm(s), and/or wheel(s).

The physical members or other parts of robotic system 100 may further include actuators arranged to move the physical members in relation to one another. An actuator is a mechanism that may be used to introduce mechanical motion. An actuator may be configured to convert stored energy into movement of one or more components. Various mechanisms may be used to power an actuator. For instance, actuators may be powered by chemicals, compressed air, hydraulics, or electricity, among other possibilities. With this arrangement, actuators may cause movement of various movable components of the robotic system 100. For instance, the arm(s) may include one or more members connected by joints and configured to operate with various degrees of freedom with respect to one another via actuators.

Furthermore, the mechanical components 110 may include one or more end-effector(s). For instance, an end-effector may be disposed on the end of an arm, which can be operated via actuators to position the end-effector. The end-effector(s) may be employed to perform a task by manipulating objects, acting on loads, etc. For instance, the robotic system 100 may use the end-effector(s) for gripping, turning, carrying, pulling, and/or pushing objects. The end-effector(s) may include hand-like structures with movable fingers. Alternatively or additionally, the end-effector(s) may include other types of appendages or attachments, such as grippers, welding tools, cutting tools, among other possibilities.

The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, legs, and/or end-effectors so that these appendages can be replaced or changed as needed or desired. In some embodiments, the robotic system 100 may include one or more removable and/or replaceable battery units or sensors. Other types of removable components may be included within some implementations.

The robotic system 100 may include the sensor(s) 112 arranged to sense aspects of the robotic system 100. The sensor(s) 112 may include one or more force sensors, torque sensors, velocity sensors, acceleration sensors, gyroscopic sensors, position sensors, proximity sensors, motion sensors, location sensors, load sensors, temperature sensors, thermal imaging sensors, touch sensors (e.g., capacitive sensors), optical sensors, wireless sensors, radio sensors, depth sensors (e.g., RGB-D, laser, structured-light, and/or a time-of-flight camera), point cloud sensors, range sensors (e.g., ultrasonic and/or infrared), infrared sensors, object sensors, and/or cameras (e.g., color cameras, grayscale cameras, and/or infrared cameras), three-dimensional (3D) scanners, x-ray scanners, spectral scanners, Radio Frequency identification (RFID) systems, Near Field Communication (NFC) chips, among other possibilities. Within some examples, the robotic system 100 may be configured to receive sensor data from the sensor(s) 112 that are physically separated from the robot (e.g., sensors that are positioned on other robots or located within the environment in which the robot is operating). Further, the sensor(s) 112 may be incorporated within existing devices, such as mobile phones, laptops, and/or tablets.

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), a laser tracker system, one or more cameras (e.g., stereoscopic cameras for 3D vision), a global positioning system (GPS) transceiver, and/or other sensors for capturing information of the environment in which the robotic system 100 is operating. The sensor(s) may also include The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm to measure the load on the actuators that move one or more members of the arm. As another example, the robotic system 100 may use one or more position sensors to sense the position of the actuators of the robotic system. For instance, such position sensors may sense states of extension, retraction, or rotation of the actuators on arms.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or the electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

The robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

III. Example Embodiment of a Robotic System

Figure 2A:
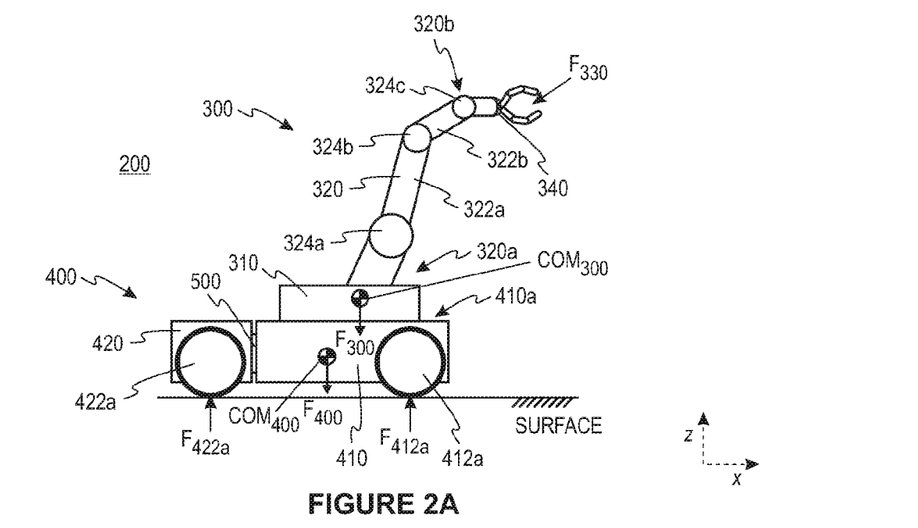
FIG. 2A illustrates an example robotic system including an upper body and a lower body, according to aspects of the present disclosure.

FIG. 2A illustrates an example robotic system 200. The robotic system 200 includes an upper body 300 and a lower body 400. The upper body 300 includes a base 310, an arm 320, and an end-effector 330. The arm 320 extends upwardly from the base 310 at a first end 320*a*. The arm 320 includes a first member 322*a* that is coupled to the base 310 via a first joint 324*a*. The arm 320 also includes a second member 322*b* that is coupled to the first member 322*a* via a second joint 324*b*. The members 322*a-b* are configured to operate with various degrees of freedom via actuators. The members 322*a-b* can move relative to each other as well as the base 310. As used herein, relative motion/rotation may generally mean that one body may move/rotate at one rate and/or direction, while another body in comparison does not move/rotate or moves/rotates at a different rate and/or direction.

The end-effector 330 is disposed at a second end 320*b* of the arm 320. In particular, the end-effector 330 is coupled to, and moves relative to, the second member 322*b* via a third joint 324*c*. The arm 320 can rotate about the base 310 about the z-axis as shown in FIG. 2A. By rotating about the base 310 and actuating movement of the members 322*a*, *b*, the arm 320 can position the end-effector 330 within a three-dimensional space.

The end-effector 330 may be employed to perform a task by manipulating objects, acting on loads, etc. For instance, the robotic system 200 may use the end-effector 330 for gripping, turning, carrying, pulling, and/or pushing objects. As shown, the end-effector 330 may include a gripping structure with movable fingers. Alternatively, the end-effector 330 may include other types of appendages or attachments, such as welding tools, cutting tools, nail guns, glue guns, among other possibilities. To perform the tasks with the end-effector 330, the robotic system 200 may employ aspects of the robotic system 100 described above, including the mechanical components 110, the sensor(s) 112, the power source(s) 114, the electrical components 116, and/or the control system 118.

Figure 2B:
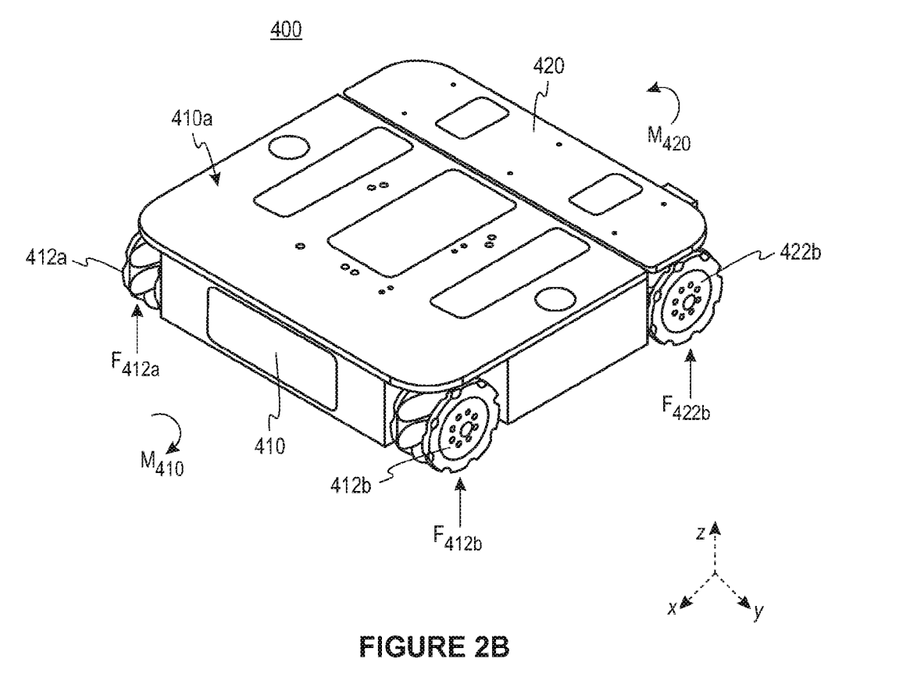
FIG. 2B illustrates an example lower body for the robotic system of FIG. 2A, according to aspects of the present disclosure.

The lower body 400 of the robotic system 200 includes a front section 410 and a rear section 420 that are joined together via a pivot coupling 500. FIG. 2B illustrates a perspective view of the lower body 400. As shown together in FIGS. 2A-B, the front section 410 includes two opposing front wheels 412*a-b* in contact with a surface (e.g., ground surface) below the lower body 400. Similarly, the rear section 420 includes two opposing rear wheels 422*a-b* in contact with the surface. The wheels 412*a-b*, 422*a-b* may be electromechanically actuated. As shown in FIG. 2B, the wheels 412*a-b*, 422*a-b* may be holonomic or omnidirectional wheels that allow the lower body 400 to move with two degrees of freedom. Although the front section 410 and the rear section 420 are each shown with two wheels, other embodiments of the front section or the rear section may include any number of wheels (i.e., one or more wheels).

The base 310 of the upper body 300 is coupled to an upper surface 410*a* of the front section 410. The wheels 412*a-b*, 422*a-b* can thus be operated to move the upper body 300 along the surface. In particular, the upper body 300 may be moved to position the end-effector 330 at one or more locations where it can perform one or more tasks.

In general, the lower body 400 supports the upper body 300 on the surface. The weight of the upper body 300, i.e., a gravitational force $F_{300}$, is applied to the lower body 400. As shown in FIG. 2A, the gravitational force $F_{300}$ effectively acts in the negative z-direction at a center of mass $COM_{300}$ of the upper body 300.

Additionally, the weight of the lower body 400, i.e., a gravitational force $F_{400}$, effectively acts in the negative z-direction at a center of mass $COM_{400}$ of the lower body 400. In response to the gravitational forces $F_{300}$, $F_{400}$, the lower body 400 experiences corresponding reaction forces at contact points between the lower body 400 and the surface. In particular, a reaction force $F_{412a}$ may act on the wheel 412*a*, a reaction force $F_{412b}$ may act on the wheel 412*b*, a reaction force $F_{422a}$ may act on the wheel 422*a*, and a reaction force $F_{422b}$ may act on the wheel 422*b*. To balance the lower body 400 statically relative to the z-axis, the vector sum of the reaction forces $F_{412a}$, $F_{412b}$, $F_{422a}$, $F_{422b}$ and the gravitational forces $F_{300}$, $F_{400}$ is equal to zero.

The magnitude of each reaction force $F_{412a}$, $F_{412b}$, $F_{422a}$, $F_{422b}$ depends on the locations of the centers of mass $COM_{300}$, $COM_{400}$. According to one example, the center of mass $COM_{400}$ of the lower body 400 is centered between the wheels 412*a-b*, 422*a-b* along the x-axis and the y-axis. Additionally, the center of mass $COM_{300}$ of the upper body 300 is also centered between the wheels 412*a-b*, 422*a-b* along the x-axis and the y-axis. Assuming that the gravitational forces $F_{300}$ and $F_{400}$ are the only forces acting on the robotic system 200, the reaction forces $F_{412a}$, $F_{412b}$, $F_{422a}$, $F_{422b}$ are all equivalent in magnitude.

According to another example, however, the center of mass $COM_{300}$ of the upper body 300 is not centered between the wheels 412*a-b*, 422*a-b*. In this example, the gravitational force $F_{300}$ from the upper body 300 produces a moment $M_{300}$ about the lower body 400. The moment $M_{300}$ may include components about the x-axis and/or y-axis. Correspondingly, the resulting reaction forces $F_{412a}$, $F_{412b}$, $F_{422a}$, $F_{422b}$ also combine to produce a reaction moment $M_R$ about the lower body 400 to oppose the moment $M_{300}$. To produce the reaction moment $M_R$ in this example, the reaction forces $F_{412a}$, $F_{412b}$, $F_{422a}$, $F_{422b}$ are not all equal in magnitude.

As described above, the robotic system 200 can operate the arm 320 and the end-effector 330 to perform a respective task. To perform different tasks, the robotic system 200 can move the end-effector 330 with the arm 320 to different positions in order to reach and move objects, act on loads, etc. The position of the center of mass $COM_{300}$ of the upper body 300 may change when the arm 320 and the end-effector 330 are repositioned. The change in the position of the center of mass $COM_{300}$ changes the effect of the gravitational force $F_{300}$ on the lower body 400 as described above. Correspondingly, the moment $M_{300}$ produced by the gravitational force $F_{300}$ also changes. To maintain the balance of the robotic system 200, the reaction forces $F_{412a}$, $F_{412b}$, $F_{422a}$, $F_{422b}$ combine to produce a new reaction moment $M_R$ about the lower body 400 to oppose the new moment $M_{300}$.

When performing a task, the end-effector 330 may also experience an external end-effector force $F_{330}$ as shown in FIG. 2A. For example, if the end-effector 330 is tasked with carrying an object, the end-effector force $F_{330}$ may include the weight of the respective object acting in the negative z-direction. In another example, if the end-effector 330 is tasked with pushing a large object along the surface, the end-effector force $F_{330}$ may include the opposing frictional forces between the large object and the surface. Thus, in addition to the gravitational forces $F_{300}$ and $F_{400}$, the lower body 400 may experience the external forces $F_{330}$ via the upper body 300. Furthermore, the lower body 400 may experience an end-effector moment $M_{330}$ produced by the end-effector force $F_{330}$. As such, the reaction forces $F_{412a}$, $F_{412b}$, $F_{422a}$, $F_{422b}$ may also act to oppose the end-effector force $F_{330}$ and the end-effector moment $M_{330}$.

In general, the lower body 400 may experience different forces while supporting the upper body 300 along the surface. As shown in FIGS. 2A-B, the wheels 412a-b, 422a-b are all in stable contact with the surface which is a level plane (i.e., a plane parallel to the x-y plane and perpendicular to the gravitational forces). Thus, the reaction forces can be experienced via all of the wheels 412a-b, 422a-b. In this case, all of the wheels 412a-b, 422a-b can establish effective traction when operated to move the robotic system 200 along the surface.

Figure 2C:
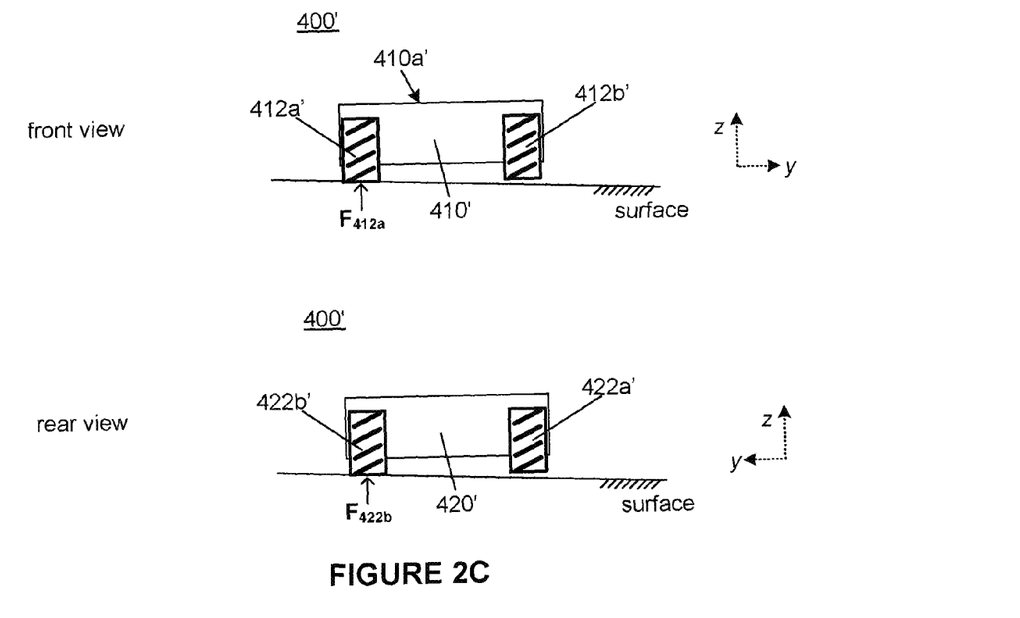
FIG. 2C illustrates an example implementation of a possible lower body configuration for a robotic system.

In a possible configuration of a lower body 400' for the robotic system 200, the front section 410' may be fixedly coupled to the rear section 420', so that the front section 410' and the rear section 420' cannot move relative to each other. As such, the front section 410' and the rear section 420' act as a single rigid body. For this possible configuration, FIG. 2C illustrates a front view of the front section 410' of the lower body 400' showing the front wheels 412a'-b' and a rear view of the rear section 420' showing the rear wheels 422a'-b', where the surface under the front wheels 412a'-b' is not angled in the same direction and/or to the same degree as the surface under the rear wheels 422a'-b'. Unlike FIGS. 2A-B, the surface is not a level plane. In particular, the surface is shaped so that: (i) below the front wheels 412a'-b', the surface angles in the negative z-direction from the wheel 412a' to the wheel 412b along the positive y-direction; and (ii) below the rear wheels 422a'-b', the surface angles in the negative z-direction from the wheel 422b' to the wheel 422a', but along the negative y-direction. Because the front section 410' and the rear section 420' act as a single rigid body, the wheel 412b' of the front section 410' and the wheel 422b' of the rear section 420' cannot contact the surface at the same time. Although the reaction force $F'_{412a}$ on the wheel 412a' may generate a moment on the single rigid body that acts to rotate the wheel 412b' toward the surface, the reaction force $F'_{422b}$ on the wheel 422b' creates an opposing moment on the single rigid body that prevents such rotation. Conversely, the moment generated by the reaction force $F'_{422b}$ cannot cause the wheel 422a' to rotate toward the surface due to the moment generated by the reaction force $F'_{412a}$. Accordingly, in the configuration of FIG. 2C, the lower body 400' cannot establish contact with all four wheels 412a'-b', 422a'-b' and to provide stable support for the robotic system 200 when the surface is not a level plane.

In contrast to the fixed coupling illustrated in FIG. 2C, the front section 410 and the rear section 420 are joined together via the pivot coupling 500. Referring to FIG. 2B, the pivot coupling 500 joins the front section 410 and the rear section 420 so that they can move together laterally along the x-, y-, and/or z-axes and/or rotate together about the y- and/or z-axes. However, the pivot coupling 500 allows the front section 410 and the rear section 420 to rotate separately relative to each other about the x-axis. For instance, when the front section 410 experiences a moment $M_{410}$ as shown in FIG. 2B, the pivot coupling 500 sufficiently decouples the front section 410 from the rear section 420 to allow the front section 410 to rotate relative to the rear section 420 in response to the moment $M_{410}$. Additionally or alternatively, when the rear section 420 experiences a moment $M_{420}$ as shown in FIG. 2B, the pivot coupling 500 sufficiently decouples the rear section 420 from the front section 410 to allow the rear section 420 to rotate relative to the front section 410 in response to the moment $M_{420}$.

Figure 2D:
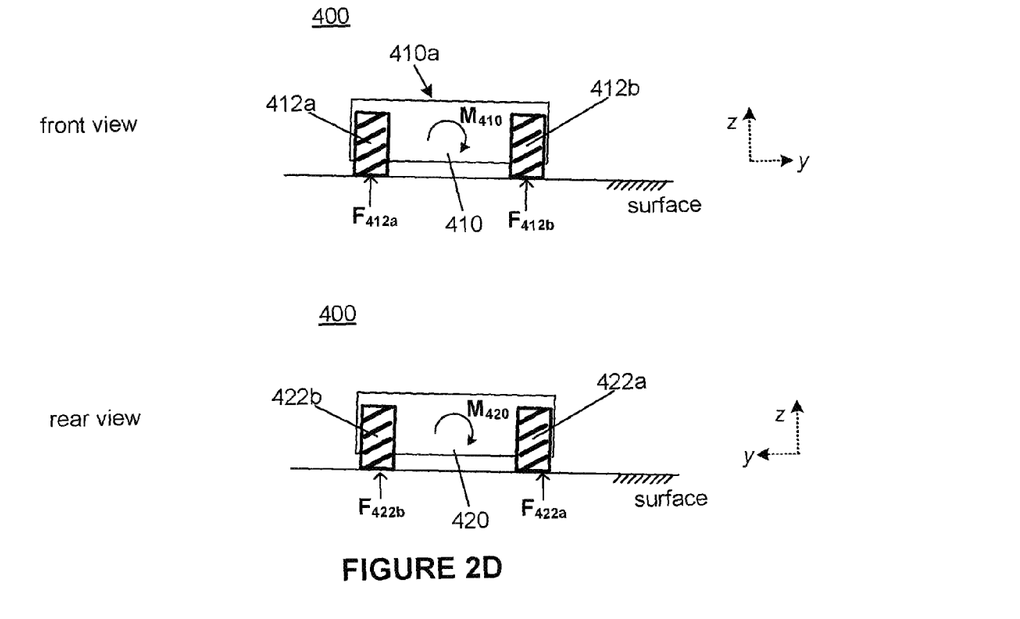
FIG. 2D illustrates an example implementation of the lower body of FIG. 2B, according to aspects of the present disclosure.

Accordingly, FIG. 2D illustrates a front view of the front section 410 of the lower body 400 showing the front wheels 412a-b and a rear view of the rear section 420 showing the rear wheels 422a-b. Like the example of FIG. 2C, the surface is not a level plane. In FIG. 2D, however, the front section 410 and the rear section 420 are coupled with the pivot bearing 500 and thus do not act as a single rigid body when experiencing moments (e.g., $M_{410}$, $M_{420}$) about the x-axis. As such, all four wheels 412a-b, 422a-b can establish contact with the surface and provide stable support for the robotic system 200 even when the surface is not a level plane.

With the pivot coupling 500, the lower body 400 can respond more effectively to changes in forces and moments it experiences, including the forces and moments from the upper body 300 and the surface. In response to changes in the forces and moments, the front section 410 and the rear section 420 are able to rotate relative to each other about the x-axis so that all four wheels 412a-b, 422a-b can remain in contact with the surface to provide better balance.

Although the example robotic system 200 includes the upper body 300 with the arm 320 and the end-effector 330 disposed on the arm 320, aspects of the lower body 400 can provide a base for other robotic system configurations. For instance, in some configurations, the lower body 400 above can support an upper body that experiences loads via structures other than an arm and/or an end-effector. In other configurations, the lower body 400 can support a lifting mechanism similar to a pallet jack or a fork lift. In yet other configurations, the lower body 400 can support a cargo container or receptacle. In further configurations, the lower body 400 can support a conveyor belt that unloads or loads objects from or to a truck container or pallet. In general, the robotic system 200 provides an example of how aspects of the lower body 400 can provide a base for various robotic system configurations that experience loads.

IV. Example Pivot Coupling

Figure 3A:
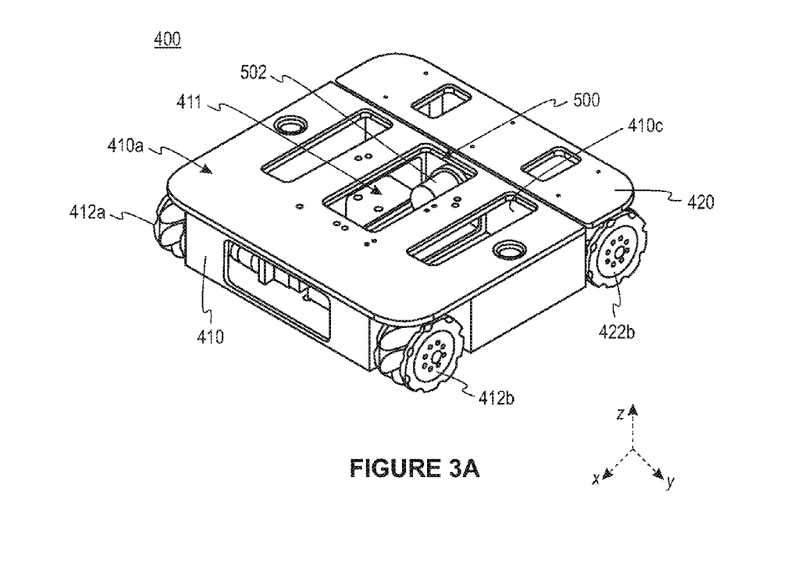
FIG. 3A illustrates an example assembly coupling a front section and a rear section of a lower body for a robotic system, according to aspects of the present disclosure.
Figure 3B:
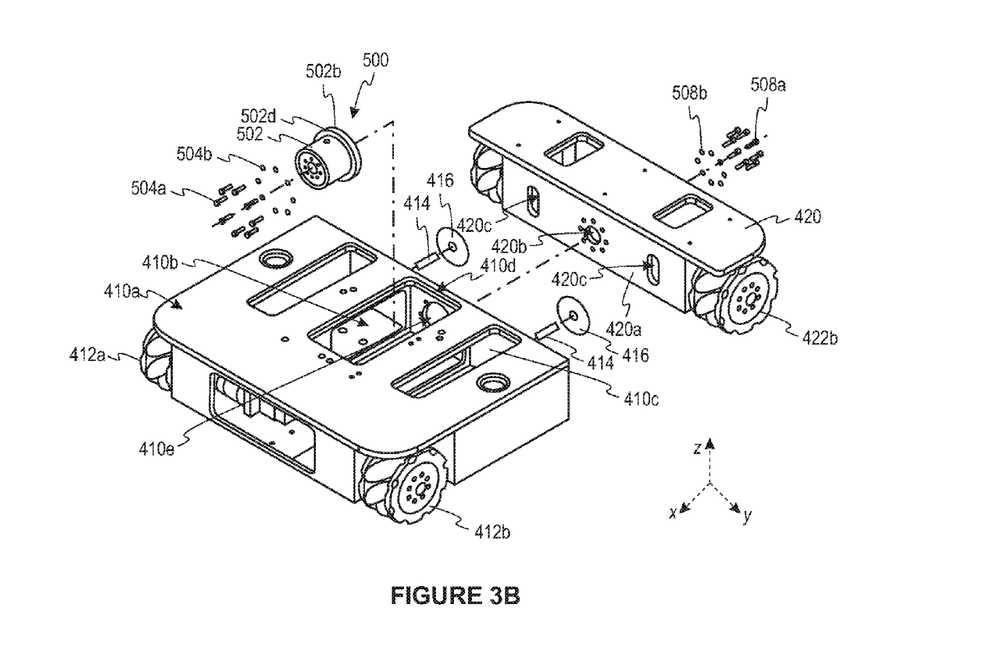
FIG. 3B illustrates another view of the example coupling assembly of FIG. 3A, according to aspects of the present disclosure.

FIGS. 3A-B illustrate how the front section 410 and the rear section 420 of the lower body 400 described above may be assembled with an example pivot coupling 500. Additionally, FIGS. 4A-C illustrate the assembly of the example pivot coupling 500.

As shown in FIGS. 3A-B, the front section 410 includes a rear wall 410c that is adjacent to a front wall 420a of the rear section 420. To couple the front section 410 and the rear section 420, the pivot coupling 500 is attached to the front section 410 via the rear wall 410c and the pivot coupling 500 is attached to the rear section 420 via the front wall 420a.

Figure 4A:
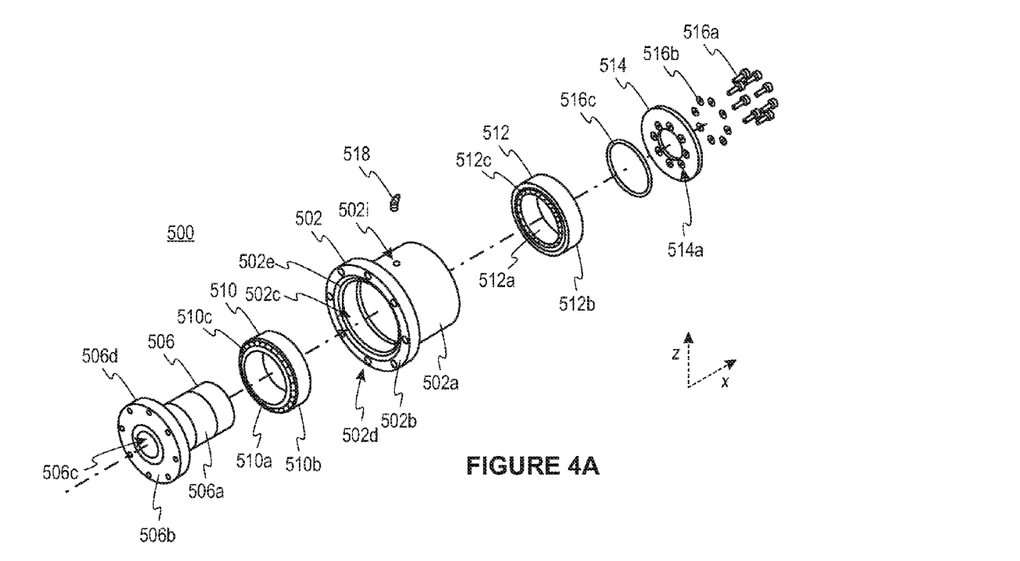
FIG. 4A illustrates an example coupling assembly, according to aspects of the present disclosure.
Figure 4B:
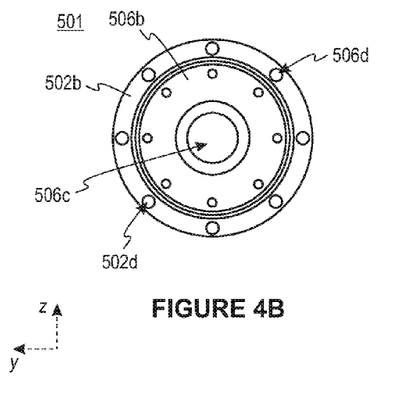
FIG. 4B illustrates another view of the example coupling assembly of FIG. 4A, according to aspects of the present disclosure.
Figure 4C:
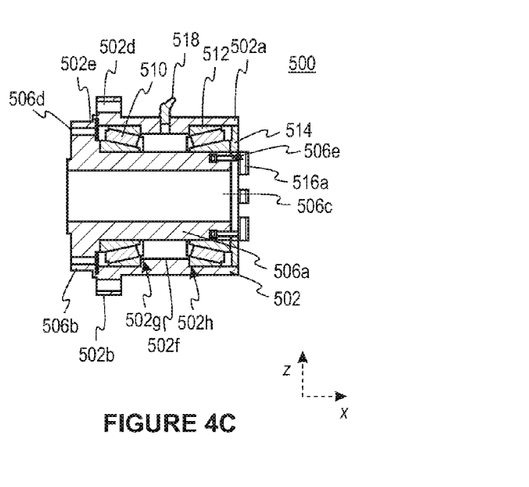
FIG. 4C illustrates yet another view of the example coupling assembly of FIG. 4A, according to aspects of the present disclosure.

Referring for instance to FIGS. 3B and 4A, the pivot coupling 500 includes a housing 502. The housing 502 includes a tubular housing wall 502a, a housing collar 502b, and a housing chamber 502c. The housing collar 502b is disposed at one end of the housing 502 and extends radially outward from a periphery of the housing wall 502a. Housing apertures 502d are formed in the housing collar 502b.

Front section apertures 410d corresponding to the housing apertures 502d are formed in the rear wall 410c of the front section 410. The housing 502 is positioned in an interior 410b of the front section 410. The housing apertures 502d are aligned with the front section apertures 410d. To attach the pivot coupling 500 to the front section 410, housing fasteners 504a (e.g., socket head cap screws) are screwed with washers 504b through the front section apertures 410d and into the corresponding housing apertures 502d.

The pivot coupling 500 also includes a spindle 506 that is positioned in the housing chamber 502c. The spindle 506 includes a tubular spindle wall 506a, a spindle collar 506b, and a cylindrical spindle passageway 506c. The spindle collar 506 abuts a lip 502e formed on the housing collar 502b. Spindle collar apertures 506d are formed in the spindle collar 506b.

Rear section apertures 420b corresponding to the spindle collar apertures 506d are formed in the front wall 410a of the rear section 420. When the housing apertures 502d are aligned with the front section apertures 410d to attach the pivot coupling 500 to the front section 410, the spindle collar apertures 506d are also aligned with the rear section apertures 420b. To attach the pivot coupling 500 to the rear section 420, spindle fasteners 508a (e.g., socket head cap screws) are screwed with washers 508b through the rear section apertures 420b and into the corresponding spindle collar apertures 506d.

A central opening 410e is also formed in the rear wall 410c of the front section 410. When the housing 502 is positioned in the interior 410b of the front section 410, the spindle fasteners 508a can access the spindle collar apertures 506d through the central opening 410e.

FIG. 4B generally illustrates a coupling interface 501 that is defined by the arrangement of housing apertures 502d and the spindle collar apertures 506d. When the pivot coupling 500 is positioned in the front section 410, the coupling interface 501 is positioned against the rear wall 410c of the front section 410 for attachment to both the front section 410 and the rear section 420.

Referring to FIGS. 4A, C, the pivot coupling 500 also includes a first tapered roller bearing 510 and a second tapered roller bearing 512. Each tapered roller bearing 510, 512 includes, respectively: an inner ring 510a, 512a; an outer ring 510b, 512b; and a roller assembly 510c, 512c between the inner ring 510a, 512a and the outer ring 510b, 512b. Each roller assembly 510c, 512c includes a plurality of tapered rolling elements arranged circumferentially in a cage. Each tapered roller bearing 510, 512 is configured to handle a combination of radial and axial loads, while facilitating rotation of the outer ring 510b, 512b over the tapered rollers and around the inner ring 510a, 512a, respectively.

As FIG. 4C illustrates, the tapered roller bearings 510, 512 are positioned in the housing chamber 502c between the housing wall 502a and the spindle wall 506a. An annular projection 502f is formed on the inner surface of the housing wall 502a. The first tapered roller bearing 510 is positioned against a first ridge 502g defined by one side of the annular projection 502f. Similarly, the second tapered roller bearing 512 is positioned against a second ridge 502h defined on the other side of the annular projection 502f. The first tapered roller bearing 510 is positioned according to a first orientation as shown in FIG. 4C to handle axial loads in the negative x-direction, while the second tapered roller bearing 512 is positioned according to an opposite second orientation to handle axial loads in the positive x-direction.

With the tapered roller bearings 510, 512 positioned against the ridges 502g, 502h, the spindle 506 passes through the inner rings 510a, 512a of the tapered roller bearings 510, 512, respectively. The pivot coupling 500 also includes an annular plate 514. Plate apertures 514a are formed in the annular plate 514. Spindle wall apertures 506e corresponding to the plate apertures 514a are formed on the spindle 506 on an end opposite the spindle collar 506b. With the plate apertures 514a aligned with the spindle wall apertures 506e, the plate 514 is attached to the spindle 506 by screwing plate fasteners 516a (e.g., socket head cap screws) with washers 516b through the plate apertures 514a and into the corresponding spindle wall apertures 506e. A washer 516c is also placed between the plate 514 and the spindle 506.

With the plate 514 attached to spindle 506, the spindle 506 is fixed within the housing chamber 502c. The first tapered roller bearing 510 is positioned between the spindle collar 506b and the annular projection 502f. Meanwhile, the second tapered roller bearing 512 is positioned between the plate 514 and the annular projection 502e.

A grease port 502i is also formed in the housing wall 502a and a grease nipple 518 is fitted into the grease port 502i. Once the housing 502, the spindle 506, and the tapered roller bearings 510, 512 have been assembled as shown in FIG. 4C, a high pressure grease gun is applied to the grease nipple 518 to fill the housing chamber 502c with grease and lubricate the tapered roller bearings 510, 512.

The housing 502 engages the outer rings 510b, 512b of the tapered roller bearings 510, 512, and the spindle 506 engages the inner rings 510a, 512a of the tapered roller bearings 510, 512, respectively. As such, the housing 502 can rotate about the x-axis with the outer rings 510b, 512b relative to the inner rings 510a, 512a and the spindle 506. As described above, the roller assemblies 510c, 512c facilitate this relative rotation. Correspondingly, the first section 410, which is attached to the housing 502, can rotate relative to the rear section 420, which is attached to the spindle 506.

In contrast to other coupling devices that may be employed to allow relative rotation between the front section 410 and the rear section 420, the pivot coupling 500 provides greater stability and rigidity for the operation of the lower body 400. For instance, the pivot coupling 500 can more effectively restrict rotation about the y- and z-axes. In other words, the pivot coupling 500 provides greater resistance to bending moments and/or torsion about the y- and z-axes. Furthermore, the pivot coupling 500 effectively couples the front section 410 and the rear section 420 together for lateral movement along the x-, y-, and z-axes.

As shown in FIG. 3B, grooves 420c with a specified arc-length may be formed in the front wall 420a of the rear section 420 and corresponding pins 414 may be coupled to the rear wall 410c of the front section 410. When the pivot coupling 500 couples the front section 410 to the rear section 420, the pins 414 are positioned in the grooves 420c to restrict relative rotation between the front section 410 and the rear section 420 to the specified arc-length of the grooves 420c. The front section 410 and the rear section 420 can effectively rotate about the x-axis to maintain stability and balance during normal operation of the lower body 400, but the pins 414 and grooves 420c help prevent rotation beyond normal operation. For instance, if the front section 410 is lifted off the surface, the pins 414 and grooves 420c help keep any relative rotation by the rear section 420 to less than 90 degrees. Washers 416 may also be positioned about the pins 414. The pins 414 and the washers 416 provide additional rigidity between the front section 410 and the rear section 420 and resistance to bending moments and/or torsion about the y- and z-axes.

V. Conclusion

A robotic system may include a lower body that supports and moves the robotic system along a surface. The lower body includes a front section and a rear section that are joined together via a coupling assembly. The front section includes one pair of wheels, and the rear section includes another pair of wheels. Advantageously, the coupling assembly allows the lower body to respond more effectively to changes in the forces and moments it experiences. In particular, the front section and the rear section are able to rotate relative to each other about an axis so that the position of the wheels can change to help maintain contact with the surface to provide better balance for the lower body. In contrast to other coupling devices that may be employed to allow relative rotation between the front section and the rear section, the coupling assembly in the example embodiments provides greater stability and rigidity for the operation of the lower body. In particular, the coupling assembly can more effectively restrict rotation about the other axes. In other words, if the coupling assembly allows the front section to rotate relative to the rear section about the x-axis, the coupling assembly provides greater resistance to bending moments and/or torsion about the y- and z-axes.

The above detailed description describes various features and functions of the disclosed systems, devices, and methods with reference to the accompanying figures. In the figures, similar symbols typically identify similar components, unless context indicates otherwise. The illustrative implementations described in the detailed description, figures, and claims are not meant to be limiting. Other implementations can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example implementations. Alternative implementations are included within the scope of these example implementations. In these alternative implementations, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

A computer-readable medium may include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A robotic system, comprising:
   a robotic body including a first section and a second section, the first section including a first wheel, and the second section including a second wheel; and
   a coupling assembly coupling the first section and the second section, the first section and the second section being movable together along at least one axis via operation of the first wheel and the second wheel, the coupling assembly including:
      a housing defining an interior chamber;
      a spindle disposed in the interior chamber of the housing; and
      a bearing device disposed in the interior chamber of the housing and between the housing and the spindle, the bearing device allowing the spindle to rotate inside the interior chamber and relative to the housing,
   wherein the first section is coupled to the housing of the coupling assembly and the second section is coupled to the spindle of the coupling assembly, and the coupling assembly allows the first section to rotate relative to the second section according to a rotation between the spindle and the housing, and
   the first section has a first wall and the second section has a second wall that faces the first wall when the first section is coupled to the second section, one of the first wall or the second wall including a groove having an arc-length and the other of the first wall or the second wall including a pin, the groove receiving the pin when the first section is coupled to the second section, a relative rotation between the first section and the second section being limited to the arc-length based on movement of the pin in the groove.

2. The robotic system of claim 1, wherein the coupling assembly allows the first section and the second section to move laterally together, and to rotate relative to each other along an axis.

3. The robotic system of claim 1, wherein the bearing device includes at least one tapered roller bearing, the at least one tapered roller bearing including an inner ring, an outer ring, and a bearing assembly disposed between the inner ring and the outer ring and allowing the outer ring to rotate around the inner ring, the housing engages the outer ring, and
the spindle passes through and engages the inner ring.

4. The robotic system of claim 3, wherein the at least one tapered roller bearing includes two tapered roller bearings, and the two tapered roller bearings are disposed between the spindle and the housing, the two tapered roller bearings being positioned according to opposing orientations to handle axial forces in opposing directions.

5. The robotic system of claim 1, wherein the first section has a first wall and the second section has a second wall that faces the first wall when the first section is coupled to the second section,
the coupling assembly is disposed in an interior of the first section,
the housing is coupled to the first wall in the interior of the first section, and
the second wall is coupled to the spindle via an opening in the first wall.

6. The robotic system of claim 5, wherein the housing is coupled to the first wall, and the second wall is coupled to the spindle at a same end of the coupling assembly.

7. The robotic system of claim 1, further comprising a second robotic body coupled to one of the first section or the second section, the second robotic body including an arm and an end-effector disposed at an end of the arm,
wherein the arm and the end-effector are movable relative to the first section and the second section, and
the movement of the arm or the end-effector produces a torque that causes the first section to rotate relative to the second section.

8. The robotic system of claim 1, wherein the housing of the coupling assembly includes:
a tubular housing wall defining the interior chamber; and
a housing collar extending radially outward from a periphery of the housing wall; and
the spindle of the coupling assembly includes:
a tubular spindle wall; and
a spindle collar extending radially outward from a periphery of the spindle wall, the spindle collar abutting a lip formed on the housing collar to couple the housing and the spindle and allow the bearing device to be disposed between the housing wall and the spindle wall, the first section being coupled to the housing collar, the second section being coupled to the spindle collar.

9. The robotic system of claim 8, wherein the bearing device includes a tapered roller bearing, the tapered roller bearing including an inner ring, an outer ring, and a bearing assembly disposed between the inner ring and the outer ring and allowing the outer ring to rotate around the inner ring,
the housing wall engages the outer ring, and
the spindle wall passes through and engages the inner ring.

10. A coupling assembly for a robotic system, comprising:
a housing defining an interior chamber, the housing including a first interface configured to engage a first section of a robotic body;
a spindle disposed in the interior chamber of the housing, the spindle including a second interface configured to engage a second section of a robotic body; and
two tapered roller bearings disposed in the interior chamber of the housing and between the housing and the spindle, the two tapered roller bearings being arranged in opposing orientations to handle axial forces in opposing directions, the two tapered roller bearings allowing the housing and the spindle to rotate relative to each other, the two tapered roller bearings including an inner ring, an outer ring, and a bearing assembly disposed between the inner ring and the outer ring and allowing the outer ring to rotate around the inner ring, the housing engages the outer ring, and the spindle passes through and engages the inner ring,
wherein the first interface and the second interface allows a relative rotation between the first section coupled to the first interface and the second section coupled to the second interface according to the relative rotation between the housing and the spindle, and
the first interface and the second interface are disposed on a same end of the coupling assembly.

11. The coupling assembly of claim 10, wherein the housing includes:
a tubular housing wall defining the interior chamber; and
a housing collar extending radially outward from a periphery of the housing wall and including the first interface.

12. The coupling assembly of claim 10, wherein the spindle includes:
a tubular spindle wall; and
a spindle collar extending radially outward from a periphery of the spindle wall and including the second interface.

13. The coupling assembly of claim 10, wherein the housing includes:
a tubular housing wall defining the interior chamber; and
a housing collar extending radially outward from a periphery of the housing wall and including the first interface; and
the spindle includes:
a tubular spindle wall; and
a spindle collar extending radially outward from a periphery of the spindle wall and including the second interface, the spindle collar abutting a lip formed on the housing collar to couple the housing and the spindle, and allow the two tapered roller bearings to be disposed between the housing wall and the spindle wall.

14. The coupling assembly of claim 13, further comprising a plate disposed on an end of the spindle opposite the spindle collar and fixing the spindle within the interior chamber of the housing.

15. The coupling assembly of claim 10, wherein the first interface of the housing includes a plurality of apertures configured to receive fasteners with the first section of the robotic body.

16. The coupling assembly of claim 10, wherein the second interface of the spindle includes a plurality of apertures configured to receive fasteners with the second section of the robotic body.

17. The coupling assembly of claim 10, wherein the housing includes:
a tubular housing wall defining the interior chamber; and
an annular projection formed inside the interior chamber and on an inner surface of the housing wall, the annular projection defining a first ridge and a second ridge on opposing sides of the annular projection, a first of the two tapered bearings being positioned against the first ridge, a second of the two tapered bearings being positioned against the second ridge.

18. The coupling assembly of claim 10, further comprising a grease port configured to direct grease into the interior chamber for lubricating the two tapered roller bearings.

19. A robotic system, comprising:
a robotic body including a first section and a second section, the first section including a first wheel, and the second section including a second wheel; and a coupling assembly coupling the first section and the second section, the first section and the second section being movable together along at least one axis via operation of the first wheel and the second wheel, the coupling assembly including:
    a housing defining an interior chamber;
    a spindle disposed in the interior chamber of the housing; and
    a bearing device disposed in the interior chamber of the housing and between the housing and the spindle, the bearing device allowing the spindle to rotate inside the interior chamber and relative to the housing,
wherein the first section is coupled to the housing of the coupling assembly and the second section is coupled to the spindle of the coupling assembly, and the coupling assembly allows the first section to rotate relative to the second section according to a rotation between the spindle and the housing,
the first section has a first wall and the second section has a second wall that faces the first wall when the first section is coupled to the second section,
the coupling assembly is disposed in an interior of the first section,
the housing is coupled to the first wall in the interior of the first section, and
the second wall is coupled to the spindle via an opening in the first wall.

20. The robotic system of claim 19, wherein the housing is coupled to the first wall, and the second wall is coupled to the spindle at a same end of the coupling assembly.

\* \* \* \* \*